United States Patent [19]

Andersson

[11] Patent Number: 5,792,398
[45] Date of Patent: Aug. 11, 1998

[54] HOT PRESSING METHOD OF FORMING A COMPOSITE LAMINATE CONTAINING EXPANDED THERMOPLASTIC PARTICLES

[75] Inventor: Bengt Andersson, Söråker, Sweden

[73] Assignee: Glasis Holding AB, Sundsbruk, Sweden

[21] Appl. No.: 676,886

[22] Filed: Jul. 8, 1996

Related U.S. Application Data

[63] Continuation-in-part of Ser. No. 458,711, Jun. 2, 1995, abandoned, which is a continuation of Ser. No. 162,106, filed as PCT/SE92/00401, Jun. 12, 1992 published as WO92/22424, Dec. 23, 1992, abandoned.

[30] Foreign Application Priority Data

| Jun. 12, 1991 | [SE] | Sweden | 9101791 |
| Nov. 21, 1991 | [SE] | Sweden | 9103460 |
| Mar. 5, 1992 | [SE] | Sweden | 9200674 |

[51] Int. Cl.$^6$ ............... B29C 44/06; B29C 44/10; B29C 44/12
[52] U.S. Cl. ............ 264/45.4; 264/45.4; 264/46.4; 264/46.5; 264/257; 264/258; 264/273; 264/321
[58] Field of Search ............... 521/56; 264/46.4, 264/46.5, 45.3, 257, 45.4, 321, 258, 273

[56] References Cited

U.S. PATENT DOCUMENTS

| 3,620,890 | 11/1971 | Kemmler | 161/6 |
| 3,676,288 | 7/1972 | Hoyle. | |
| 3,864,181 | 2/1975 | Wolinski et al.. | |
| 3,963,848 | 6/1976 | Bentley et al. | 428/172 |
| 4,908,930 | 3/1990 | Wycech | 264/46.1 |
| 4,919,739 | 4/1990 | Dyksterhouse et al. | 156/181 |
| 5,011,862 | 4/1991 | Melber et al. | 521/56 |
| 5,164,129 | 11/1992 | Douglas | 264/46.9 |
| 5,242,637 | 9/1993 | Inoue et al. | 264/45.4 |
| 5,484,815 | 1/1996 | Petersen et al.. | |

FOREIGN PATENT DOCUMENTS

| 0041054 | 12/1981 | European Pat. Off.. |
| 1398308 | 6/1975 | United Kingdom. |
| 1427647 | 3/1976 | United Kingdom. |

Primary Examiner—Allan R. Kuhns
Attorney, Agent, or Firm—Browdy and Neimark

[57] ABSTRACT

A composite material comprises a web shaped material which is impregnated with a curable resin and which contains thermoplastic particles distributed in the web shaped material. The thermoplastic particles are of an expandable type but occur in the composite material in substantially unexpanded form. The curable resin is in a A- or B-stage. In addition, the invention comprises use of a composite material of this nature for producing laminates by warm pressing and expanding the thermoplastic particles and a method for producing the composite material.

32 Claims, No Drawings

HOT PRESSING METHOD OF FORMING A COMPOSITE LAMINATE CONTAINING EXPANDED THERMOPLASTIC PARTICLES

CROSS-REFERENCE TO RELATED APPLICATIONS

The present application is a continuation-in-part of U.S. application Ser. No. 08/458,711, filed Jun. 2, 1995, now abandoned, which is a continuation of application Ser. No. 08/162,106, filed Dec. 10, 1993, now abandoned, which was a 371 of PCT/SE92/00401, filed Jun. 12, 1992, published as WO92/22424, Dec. 23, 1992 the entire contents of each of which are hereby incorporated herein by reference.

FIELD OF THE INVENTION

This invention is related to a composite material comprising a web shaped material, which is impregnated with curable resin and which contains thermoplastic particles distributed in the web shaped material. In addition, the invention relates to use of such a composite material for producing laminates by warm pressing and also a method for producing the composite material.

BACKGROUND OF THE INVENTION

It is known to produce a semi-manufacture of composite material in a first operation and then, in a second operation, to combine this with further material layers so as to achieve a laminate in a pressing procedure. The thermoplastic particles have been present in the semi-manufacture in expanded state, and the resin has been present in B-stage. In this connection it is to be pointed out that a curable resin, which is in A-stage, is meltable, cross-linked to a small degree and soluble in acetone and other solvents. A resin in C-stage is unmeltable, entirely cross-linked and insoluble. The B-stage is a stage between the A- and C-stages.

On production of the semi-manufacture the web shaped material is impregnated with the impregnation solution containing the curable resin and the thermoplastic particles. The semi-manufacture is thereafter obtained by heat processing so that the same obtains the character of a foam composite material. This semi-manufacture is then pressed into a laminate in a final pressing operation. On the heat processing to obtain the foam composite material, that means the semi-manufacture, substantially simultaneous expansion of the thermoplastic particles and drying occur, which means that considerable volumes of solvent are evaporated from the impregnated web shaped material. Simultaneously there is also a change of the curable resin from A-stage to B-stage. It has turned out that the simultaneous emission of solvent and expansion of the thermoplastic particles involve the disadvantage that it is very difficult to achieve a good uniformity of the foam composite material and, accordingly, also of the final laminate. This is due to the fact that the expansion of the thermoplastic particles causes a disturbance and an irregularity as far as the solvent emission and the curing of the curable resin are concerned. Furthermore, it has been found that this prior art involves a great sensitivity to area weight variations since such variations in turn give rise to variations in the degree of curing of the curable resin. The simultaneous expansion of the thermoplastic particles and the solvent emission may, furthermore, give rise to web break due to the fact that the bonding of fibres to each other in the web shaped material may be broken locally. Also in the absence of such breakages, irregularities concern the internal fibre bonding may easily cause an uneven expansion of the thermoplastic particles and, accordingly, an uneven structure of the foam composite material.

SUMMARY OF THE INVENTION

The object of the present invention is to reduce the disadvantages indicated hereinabove.

As far as the composite material is concerned, this is obtained by the thermoplastic particles being of an expandable type but being present in the composite material in substantially unexpanded form, and by the curable resin being in A- or B-stage. Thus, it is this composite material which has the character of a semi-manufacture to be suitable for use, in a subsequent warm pressing operation, for producing laminates, either by means of a plurality of like layers of the composite material or in combination with further lamination layers.

It is preferred that the composite material in its capacity as a semi-manufacture contains solvent, for instance water, to a proportion of 2–40, in particular 5–25, percent by weight. Said solvent proportion is, accordingly, that which is present when the semi-manufacture is intended to be subjected to the final warm pressing to a laminate.

The features of the use according to the invention of the composite material and the method for producing the same appear from the appended patent claims.

Due to the fact that the composite material present as a semi-manufacture has, in accordance with the present invention, the thermoplastic particles unexpanded a lower freight volume is obtained, and furthermore the material may be handled in coil form or otherwise without being broken. According to the prior art discussed by way of introduction, the semi-manufacture occurs in the form of a foamed composite having a rigid structure.

From that stated it appears that the curable resin should be, in the composite material according to the invention, in A-stage or possibly in a somewhat, but not completely, cured stage, that is at most in B-stage. The expansion or foaming of the thermoplastic particles and the final curing of the curable resin occur by warm pressing when the laminate aimed at is obtained. Due to the remaining solvent contents in the composite material according to the invention the expansion of the thermoplastic particles will proceed very homogeneously thanks to efficient heating in vapour environment. However, the problems discussed by way of introduction do not occur since the remaining solvent proportion is relatively restricted, that is suitably not higher than 25 percent by weight and preferably not higher than 15 percent by weight. Such a relatively small solvent proportion does not cause any unacceptable irregularity of the final product due to the simultaneously occurring expansion of the thermoplastic particles.

A good workability of the composite material by means of the pressing tools is obtained in accordance with the invention since shaping occurs simultaneously with or prior to the expansion of the thermoplastic particles. In accordance with the prior art discussed, the expansion of the thermoplastic particles occurs initially and thereafter the final shaping in a subsequent pressing operation.

Further advantages and features of the invention appear more closely in what follows:

DETAILED DESCRIPTION OF THE INVENTION

A more detailed description of features of the method according to the invention follows hereunder.

The composite material may for instance be produced in the following manner: A pre-condensate of a waterbased curable resin is produced in a conventional manner and the water contents is regulated so that a dry content of 30–75 percent by weight is obtained. The solution obtained in this way is provided with unexpanded thermoplastic particles, so called microspheres, in such an amount that the weight proportion microspheres: resin in the pressed composite material varies between 4:1 and 1:50. It is preferable to allow the microspheres to be included in such an amount that they in an expanded state form 50–95, preferably 75–95, percent by volume of the web shaped material and the resin mixture. The web shaped material is impregnated with the mixture of resin and microspheres in a conventional manner, e.g. by moving the web down into a bath of the mixture or by spraying the mixture on to the web. The degree of impregnation of the impregnated web may be regulated e.g. by pressing with rolls.

The curable resins preferably are formed by so called formaldehyde-based resins with carbamide, phenol, resorcinol or melamine. However, curable resins may also be used more generally, such as polycondensated resins, e.g. polyimide and polyadded resins, e.g. polyurethane.

The web shaped material may be formed by a woven or non-woven, organic or inorganic material, amongst which glass fibre, mineral fibre, cellulose fibre and polyester fibre may be mentioned in particular. It is also important that the web shaped material has a sufficient porosity to be able to be impregnated with the mixture of resin and microspheres in a satisfactory manner. In order to obtain good conditions for drying and handling the web shaped material, considered as an individual layer, it has suitably a thickness varying between 0.1 and 5 mm. On the actual laminate production in the warm press, a plurality of such individual composite material layers may, however, be combined mutually and with possible further layers and more specifically so that the thickness of the resulting laminate may be 40 mm or more. This follows from the fact that the solvent proportion has been regulated not to be adventurously high but on the other hand not lower than ensuring that the pressing operation may occur in a vapour environment favourable to a homogeneous pressing result.

The microspheres used on production of the composite material according to the invention have shells which may be formed by copolymers of vinyl chloride and vinylidene chloride, copolymers of vinyl chloride and acrylonitrile, copolymers of vinylidene chloride and acrylonitrile, and copolymers of styrene and acrylonitrile.

Furthermore, copolymers of methyl methacrylate should be mentioned, which contain up to about 20 percent by weight styrene, copolymers of methyl methacrylate and up to about 50 percent by weight of combined monomers of ethyl methacrylate, copolymers of methyl methacrylate and up to about 70 percent by weight of orto chlorostyrene. The particle size of the unexpanded spheres and, accordingly, of the expanded spheres may vary within wide limits and is chosen with guidance of the properties, which are desired of the final product. As an example on particle sizes for unexpanded spheres one may mention 1 μm to 1 mm, preferably 2 μm to 0.5 mm and in particular 5 μm to 50 μm. The diameter of the microspheres increases on expansion with a factor 2–5. The unexpanded spheres contain volatile liquid expanding agents, which are evaporated on the application of heat. These expanding agents may be formed by freons, hydrocarbons, such as n-pentane, i-pentane, neopentane, butane, i-butane and other expanding agents, which conventionally are used in microspheres of the nature here defined. The expanding agent may suitably form 5–30 percent by weight of the microsphere. The microspheres may be added to the resin solution as dried particles or in a suspension, e.g. in water or an alcohol, such as methanol.

The proportion resin to microspheres in the impregnation solution may, as has previously been pointed out, vary within wide limits and this proportion affects the properties of the final product. Conversely, one can, accordingly, choose a suitable proportion resins to microspheres in the mixture starting from a certain field of use and certain desired properties of the final product. This proportion may easily be determined by preparatory experiments in laboratory scale.

The mixture of resins and microspheres may, if so desired or required, be provided with various additives, such as stabilisers, coupling agents, fillers, fire retarding additives and/or pigments.

Thus, the thermoplastic particles occur in the composite material, considered in its capacity as a semi-manufacture, in unexpanded form and the curable resin occurs in A- or possibly B-stage. After drying to a solvent proportion of preferably 5–25 percent by weight the composite material may be prepared for the warm pressing to follow as a later operation. In that connection the composite material may for instance be coiled to coils for transportation or storage.

The solvent content may be regulated in any of many alternative ways. One possibility is to pass the impregnated web material through the nip between rolls or the like so as to achieve the desired solvent content by a pressing operation, i.e., by expelling solvent from the web material by mechanical means. However, any other mode of regulation known to those skilled in the art could also be used. One alternative in this regard is by drying in its conventional sense, i.e., an operation by which solvent from the web material (the semi-manufacture composite material) is allowed to leave the material. Such leaving could occur at any temperature as long as the thermoplastic particles are not expanded. Thus, an elevated temperature could be used so as to expedite the drying, but the elevated temperature may not be so high as to cause the thermoplastic particles to expand. As is well known in the drying art, drying may also be carried out at reduced temperatures, i.e., temperatures below normal room temperature. Reduced pressure may also be used. Another way of regulating the solvent content would be to place absorbing material layers in contact with the semi-manufacture composite material so as to extract solvent from the same to a desired degree.

On production of laminates, a porous material layer may, if desired be placed on one side or on both sides of the web shaped material impregnated with the resin mixture. This includes that said porous material layer could be located between two material webs impregnated with the resin mixture. The term "porous" in connection with the material layer means that the layer should present such openings or cavities that it on one hand allows partial penetration of the resin mixture into the material layer when the thermoplastic particles expand, and on the other hand allows solvent emission along and/or through the material layer. In practice, the material layer may be formed by some kind of fibrous layer or fibrous web, for instance a woven or non-woven, organic or inorganic fibre material. Within the expression "fibrous web" so called fibre splinter mats or splinter mats, for instance of glass or mineral, are included. Glass fibre, mineral fibre, cellulose fibre and polyester fibre may be mentioned as examples of fibre material. Particularly advantageous alternatives in this respect are to prepare the porous layer of glass wool or mineral wool.

The porous material layer may alternatively also be constituted of so called expanded metal, namely a net like metal structure formed by one single coherent metal piece. In such expanded metal there are connecting bridges which are more or less inclined in relation to the general plane of the expanded metal layer. Within these bridges, the expanded metal layer has through openings. Thus, the expanded metal layer allows solvent emission through the openings of the expanded metal layer and furthermore, the solvent may leave parallel to the expanded metal layer due to the openings and cavities present in connection with the expanded metal layer.

A further alternative as a material layer is a foam layer, for instance of melamine foam or polyester foam. Such a foam layer may, when the method is carried out, be placed on one side of the impregnated web shaped material on the warm pressing so as to provide the laminate aimed at. Such a foam layer could for the rest also be placed between layers formed by the impregnated web shaped material on the warm pressing.

As a foamed plastic, it is preferable to choose a foamed plastic having a relatively soft character. The density of the foamed plastic may for instance be chosen to about 200 kg/m³ or less. However, the density of the foamed plastic should preferably be chosen to about 5 kg/m³ or more. Particularly advantageous results have been achieved with foamed plastics having densities lying between 5 and 80 kg/m³.

When using glass wool or mineral wool for the porous material layer, the density is preferably chosen to be somewhere between 50 and 300 kg/m³, between 100 and 200 kg/m³ being particularly preferred.

The combination of the composite material consisting of the impregnated web shaped material and said porous material layer may be placed in a warm press or the like and is there subjected to heat so that the remaining solvent proportion is evaporated and the thermoplastic particles are expanded.

The material layer and the impregnated web shaped material are prepared or chosen so that a partial penetration of the resin mixture into the material layer occurs when the thermoplastic particles expand. In this way an excellent mutual connection between the resin mixture, the web shaped material and the porous material layer is obtained. As already pointed out, the material layer is preferably chosen to have such a porous character that the remaining solvent to a substantial degree may leave along and/or through the material layer. In a normal press structure, the solvent is emitted to a major part towards the sides through that part of the porous material layer which is not occupied by resin mixture penetrating into the material layer.

It has been described hereinabove for exemplifying purposes that it is possible to combine, on warm pressing of the composite material according to the invention, this material with further material layers, such as porous layers. However, it should be carefully noted that such porous material layers are not necessary but the warm pressing may occur with a plurality of composite material layers each consisting of an impregnated web shaped material and possible further, non-porous layers. Such an embodiment is particularly advantageous to realize in view of the fact that the solvent proportion in the composite material has been regulated, preferably by drying, before the warm pressing to a value preferably lying within 5–25 percent by weight.

The curing of the curable resin to C-stage occurs in one and the same stage in the warm press as the evaporation of the remaining solvent and the expansion of the thermoplastic particles, the order in time preferably being such that the evaporation of the solvent and the expansion of the thermoplastic particles occur approximately simultaneously whereas the final curing of the curable resin occurs thereafter in connection with the temperature increase which results when the main part of the volume of the solvent has been emitted.

The composite material of the impregnated web shaped material and possible further material layers is preferably placed in the warm press, which is then closed to a certain given press slot width. The expansion of the thermoplastic particles following thereafter gives rise to such a volume increase that a pressing function is obtained between the press surfaces without having to move the press surfaces towards each other.

The temperature in the heating device, warm press or the like during the processing of the composite material may vary between 100° and 200° C., preferably 120°–160° C. Good results have been achieved in experiments at about 140° C.

As has already been mentioned, it is a mission for the porous material layer to act, when it occurs, so that the solvent may leave along and/or through the material layer. Moreover, the porous material layer may also have other functions. More specifically, it may simply act as a spacer layer in various sandwich-like composite materials and this independently of whether layers obtained by the impregnated web shaped material are present on both sides or only on one side of the material layer. The porous material layer may also have the character of a non-expensive filler material.

In a possible embodiment according to the invention, in which embodiment impregnated material webs are placed on both sides of a porous material layer, the porous material layer, the impregnated web shaped material and the heat and press conditions are chosen so that the curable resin and/or the thermoplast form connecting bridges through the porous material layer. However, the connecting bridges may, in such an embodiment, not become so extensive that they prevent solvent emission along and/or through the material layer. Such connecting bridges between the layers obtained by the impregnated web shaped material and located on either sides of the porous material layer involve a more stable mutual connection of the layers obtained by means of the impregnated, web shaped material than the connection which could be provided by the porous material layer alone. In this way improved strength properties, for instance regarding rigidity of the composite material obtained but primarily in respect of the resistance to splittering of the composite along the porous material layer, are achieved. The connecting bridges involve, furthermore, a higher degree of resistance to compression of the porous material layer in particular when easily compressible, porous material layers are involved. The connecting bridges are particularly preferable in such cases where the porous material layer is formed by foamed plastic or otherwise a material which is relatively soft or has a low density but where good strength properties are desirable despite such softness or low density.

Non limiting examples on production of the composite material according to the invention follow hereunder:

EXAMPLE 1

Unexpanded thermoplastic particles are added to a formaldehyde based resin (for instance melamine, phenol) in an aqueous solution with a dry contents of 50% so as to obtain a dry contents proportion of 15%. A web shaped material in the form of a fibre web is impregnated with the mixture and dried to a residual moisture contents of 15 percent by weight.

On one side or both sides of the impregnated fibre web a glass fibre mat or an expanded metal layer is placed. The combination is placed in a warm press having for instance a temperature of 140° C. with a given slot. When the thermoplastic particles expand, a partial penetration of the resin mixture into the glass fibre mat or expanded metal layer is obtained. The residual moisture is expelled for the largest part towards the sides through that part of the glass fibre mat or expanded metal layer which is not filled by the resin mixture. Thus, approximately simultaneous drying and expansion occur with direct following successive curing of the curable resin. The expression "given slot" indicates that the slot of the press is not changed during the actual pressing operation. Instead, the pressing operation is obtained due to the expansion of the thermoplastic particles. Thus, the material between the press surfaces will expand to such a degree that a pressing operation will be obtained between the press surfaces. It follows from this that the starting slot width should be adapted to the expansion of the thermoplastic particles.

EXAMPLE 2

Mats, the dry weight of which were 350 g/m$^2$, and which had been impregnated with a mixture of a curable resin in a solvent and unexpanded thermoplastic particles were placed in a warm press on both sides of a porous material layer consisting of a polyether foam having a thickness of 5 mm and a density of 30 kg/m$^3$. These impregnated mats comprised on their sides facing towards the foamed plastic layer, glass fibre splinters to an amount of 100 g/m$^2$. The mats were dried to a moisture contents of 20 percent by weight.

After pressing, a sheet like product was obtained with a thickness of 4 mm and with hard surfaces and a good rigidity. The surface weight was 850 g/m$^2$. The mats located on the surfaces, said mats consisting of glass fibre, were partially interconnected by means of connecting bridges extending through the foamed plastic layer located therebetween. These connecting bridges consisted of a mixture of the curable resin and the thermoplast.

EXAMPLE 3

A glass fibre mat, which was impregnated with a mixture of a curable resin in a solvent and unexpanded thermoplastic particles and which had a surface weight (dry weight) of 350 g/m$^2$, and a glass splinter mat having a surface weight of 50 g/m$^2$ were placed in a warm press. After pressing a hard and rigid sheet product was obtained, in which the resin mixture partially penetrates the glass splinter mat. On suitable selection of mat thicknesses and impregnation conditions and pressing conditions, it is achieved that the resin mixture at some places penetrates entirely through the glass splinter mat.

EXAMPLE 4

The procedure is as in example 3 with the exception that glass splinter mats with a surface weight of 50 g/m$^2$ were placed on both sides of the impregnated glass fibre mat. Thus, the glass splinter mats will form surface layers on both sides of the sheet product together with the resin mixture penetrated thereinto.

EXAMPLE 5

A glass fibre mat, which had a surface weight of 350 g/m$^2$ and impregnated with a mixture of a curable resin in a solvent and unexpanded thermoplastic particles, and a mineral wool layer with a thickness of 15 mm and a density of 150 kg/m$^3$ were placed in a warm press. The resin mixture penetrates, on pressing, 1–2 mm into the mineral wool so that an intimate adhesion is obtained.

EXAMPLE 6

The procedure was the same as in example 5 with the exception that impregnated glass fibre mats were placed on both sides of the mineral wool layer.

EXAMPLE 7

A glass fibre mat having an area weight of 55 g per m$^2$ is impregnated with an impregnation solution containing a curable melamine resin and unexpanded thermoplastic particles. The impregnated mat (the composite material) is dried carefully to a residual moisture content of 15 percent by weight and an area weight of 200 g per m$^2$.

Four glass fibre mats of this nature are warm pressed in a warm press for achieving a laminate during 1 minute at a temperature of 160° C. As a result a high quality foam-like laminate having a thickness of 4 mm was obtained.

EXAMPLE 8

The procedure according to example 7 was repeated, with the only difference that a glass fibre mat having an area weight of 100 g per m$^2$ was used and this resulted, after impregnation and careful drying, in a composite material (semi-manufacture) having a residual moisture content of 15 percent by weight and a surface weight of 350 g per m$^2$.

Laminate pressing in a warm press of an arbitrary number of these impregnated glass fibre mats gave rise to high quality laminates.

The method according to the invention is of course not only restricted to the examples cited here. In order to clarify this it may be mentioned that the method by suitable selection of materials in the porous material layer and the impregnated web shaped material and suitable selection of heat processing or warm pressing conditions could cause solvent emission to occur during a considerable part of the process along and/or through the porous material layer but in the final stage of the manufacturing process, the resin mixture could penetrate so almost entirely into the porous material layer that the latter would no longer give any porous impression but instead be substantially filled by the resin mixture, which would also be present on the surface of the material layer which was originally porous, independently of whether this surface was placed outermost towards the surroundings or formed an interface to a further layer comprised in the laminate. Also further modifications are possible within the scope of the invention.

What is claimed is:

1. A method for producing a cured resin and foam-containing laminate by hot pressing, comprising:
    (i) preparing a semi-manufacture composite material by
        (a) providing a fibrous web material,
        (b) providing an impregnation solution containing a solvent, thermoplastic particles and a curable resin, said thermoplastic particles being expandable but occurring in the impregnation solution in unexpanded form,
        (c) impregnating the fibrous web material with the impregnation solution, and
        (d) regulating the solvent contents of the semi-manufacture composite material to not more than 40 percent by weight, said semi-manufacture composite material having the thermoplastic particles unexpanded and the curable resin in A- or B-stage, and (ii) hot pressing of said semi-manufacture composite material, to provide the cured resin and foam-containing laminate, the hot pressing being conducted so that the curable resin is caused to change from A- or B-stage to C-stage, the thermoplastic particles are caused to expand, and solvent contents remaining in the semi-manufacture composite material are caused to be evaporated.

2. A method according to claim 1, wherein the composite material is subjected to hot pressing together with one or more other laminating materials.

3. A method according to claim 1, wherein the width of a pressing slot of the hot press is maintained substantially unchanged during the pressing operation and the pressing function is achieved by causing the thermoplastic particles in the composite material to expand in the pressing slot.

4. A method according to claim 2, wherein the width of a pressing slot of the hot press is maintained substantially unchanged during the pressing operation and the pressing function is achieved by causing the thermoplastic particles in the composite material to expand in the pressing slot.

5. A method according to claim 1, wherein said regulating step causes the solvent content in the composite material to be from 2 to 40 percent by weight.

6. A method according to claim 5, wherein said regulating step causes the solvent content in the composite material is regulated to be from 5 to 25 percent by weight.

7. A method according to claim 1, wherein said regulating step comprises drying the composite material without application of heat which would expand the thermoplastic particles.

8. A method according to claim 5, wherein said regulating step comprises drying the composite material without application of heat which would expand the thermoplastic particles.

9. A method according to claim 6, wherein said regulating step comprises drying the composite material without application of heat which would expand the thermoplastic particles.

10. A method according to claim 1, wherein the curable resin is a formaldehyde-based resin.

11. A method according to claim 10, wherein the curable resin is a formaldehyde-based resin comprising carbamide, phenol, resorcinol or melamine.

12. A method according to claim 1, wherein the curable resin is a polycondensate resin.

13. A method according to claim 12, wherein the polycondensate resin is a polyimide.

14. A method according to claim 1, wherein the curable resin is a polyadded resin.

15. A method according to claim 14, wherein the polyadded resin is a polyurethane.

16. A method according to claim 1, wherein the semi-manufacture composite material is shaped into a coil, which is unwound prior to hot pressing.

17. A method according to claim 1, wherein a porous material layer is placed on one side or on both sides of the semi-manufacture composite material, the combination of said composite material and said at least one material layer is placed in a hot press and subjected to heat therein so that the solvent is evaporated and the thermoplastic particles are expanded, the material layer and the composite material are prepared or chosen so that at least a partial penetration of the curable resin and/or the thermoplast into the material layer occurs and thereby a bond between the material layer and the web material is achieved, and the material layer is chosen so that the solvent is caused to leave, to a substantial degree, along and/or through the material layer.

18. A method according to claim 1, wherein the web material is formed by a woven or non-woven, organic or inorganic fiber material.

19. A method according to claim 17, wherein the web material is formed by a woven or non-woven, organic or inorganic fiber material.

20. A method according to claim 17, wherein the material layer is formed by foamed plastic.

21. A method according to claim 20, wherein the density of the foamed plastic is chosen to about 200 kg/m$^3$ or less.

22. A method according to claim 20, wherein the density of the foamed plastic is chosen to about 5 kg/m$^3$ or more.

23. A method according to claim 21, wherein the density of the foamed plastic is chosen to about 5 kg/m$^3$ or more.

24. A method according to claim 20, wherein the density of the foamed plastic is chosen to 5–80 kg/m$^3$.

25. A method according to claim 17, wherein the material layer is formed by a woven or non-woven, organic or inorganic fiber material.

26. A method according to claim 18, wherein the material layer is formed by a woven or non-woven, organic or inorganic fiber material.

27. A method according to claim 19, wherein the material layer is formed by a woven or non-woven, organic or inorganic fiber material.

28. A method according to claim 17, wherein the material layer is formed by expanded metal.

29. A method according to claim 17, wherein the material layer is formed by expanded metal.

30. A method according to claim 19, wherein the material layer is formed by expanded metal.

31. A method according to claim 17, the porous material layer being placed between composite materials, wherein the material layer, the composite materials and the pressing conditions are chosen so that the curable resin and/or the thermoplast form connecting bridges through the material layer.

32. A method according to claim 1, wherein, in said regulating step, the solvent content of the semi-manufacture composite material is regulated so as to be maintained sufficient to obtain, in the course of the subsequent hot pressing, homogeneous expansion of the thermoplastic particles in vapor environment.

* * * * *